US007864916B2

(12) United States Patent
Akino

(10) Patent No.: US 7,864,916 B2
(45) Date of Patent: Jan. 4, 2011

(54) X-RAY COMPUTER TOMOGRAPHY APPARATUS

(75) Inventor: Naruomi Akino, Nasushiobara (JP)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 0 days.

(21) Appl. No.: 12/537,848

(22) Filed: Aug. 7, 2009

(65) Prior Publication Data

US 2010/0034343 A1 Feb. 11, 2010

(30) Foreign Application Priority Data

Aug. 11, 2008 (JP) ............................ 2008-207018

(51) Int. Cl.
*A61B 6/00* (2006.01)

(52) U.S. Cl. ............................................ 378/4; 378/15

(58) Field of Classification Search .................... 378/4, 378/15, 19

See application file for complete search history.

(56) References Cited

U.S. PATENT DOCUMENTS

| | | | | |
|---|---|---|---|---|
| 5,396,528 | A * | 3/1995 | Hu et al. | 378/14 |
| 6,560,308 | B1 * | 5/2003 | Zmora | 378/4 |
| 2005/0175140 | A1 * | 8/2005 | Tsujii | 378/4 |
| 2009/0028288 | A1 * | 1/2009 | Horiuchi et al. | 378/4 |

* cited by examiner

*Primary Examiner*—Edward J Glick
*Assistant Examiner*—Alexander H Taningco
(74) *Attorney, Agent, or Firm*—Knoble Yoshida & Dunleavy, LLC

(57) ABSTRACT

An X-ray computer tomography apparatus includes a cone beam X-ray tube X-rays, a two-dimensional array type X-ray detector, a rotating mechanism which supports the X-ray tube, together with the X-ray detector, so as to be rotatable around the object, a reconstruction processing unit which reconstructs a full scan image based on projection data, of the projection data, which corresponds to a view count corresponding to one rotation and also reconstructs a short scan image based on projection data corresponding to a view count smaller than the view count corresponding to one rotation, a CT value shift distribution generating unit which generates a spatial distribution of CT value shifts originating from the smaller view count based on the full scan image and the short scan image, and a correcting unit which corrects the short scan image based on the spatial distribution of the CT value shifts.

18 Claims, 4 Drawing Sheets

Perform back projection
Generate full scan image (containing distortion)
Generate short scan image (containing CT value shifts)
Difference (removal of object, distortion + CT value shifts)
Threshold processing (removal of distortion)
Low-pass filter (extraction of CT value shifts)
Generate CT value shift image
Correction
Generate corrected short scan image

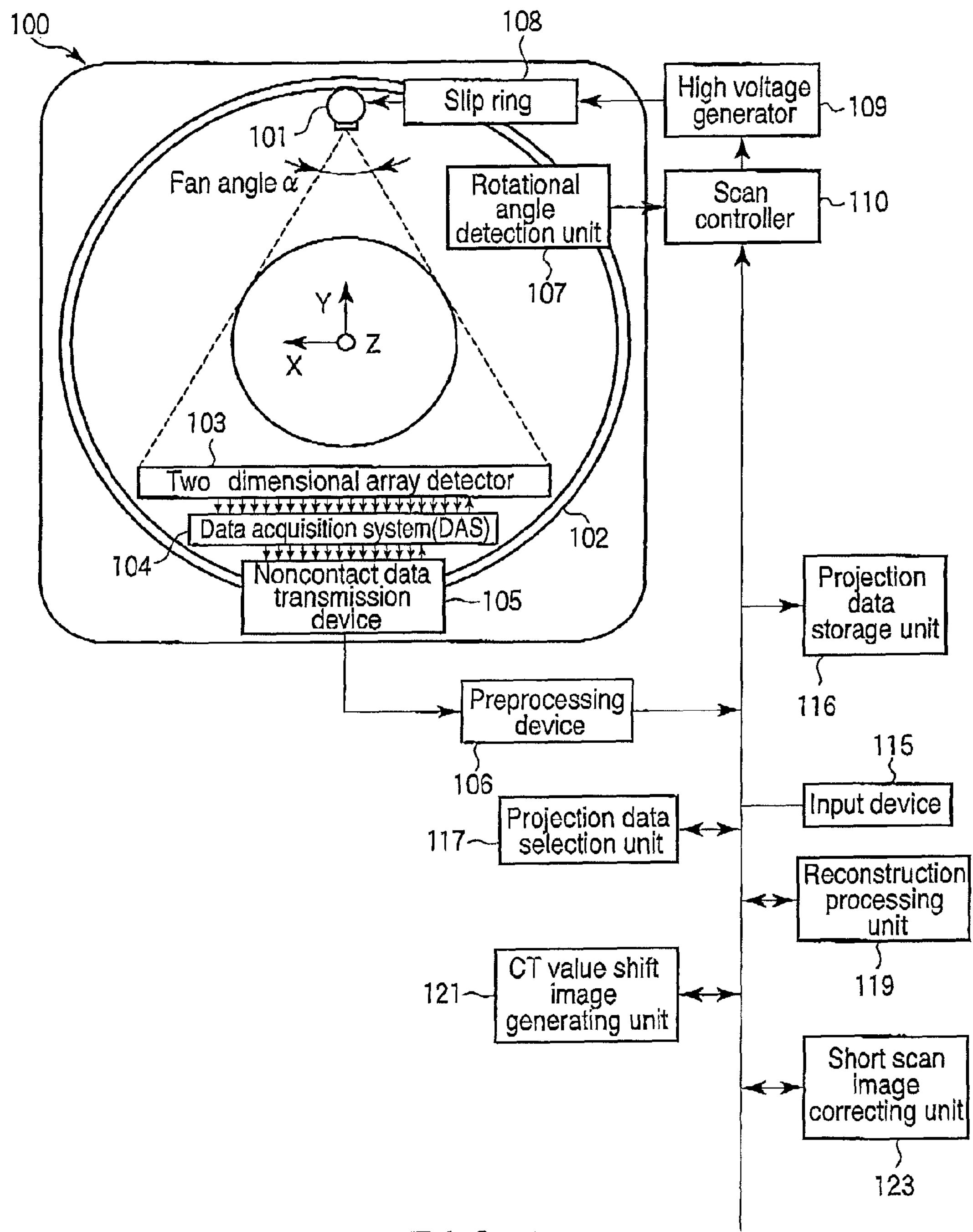
F I G. 1

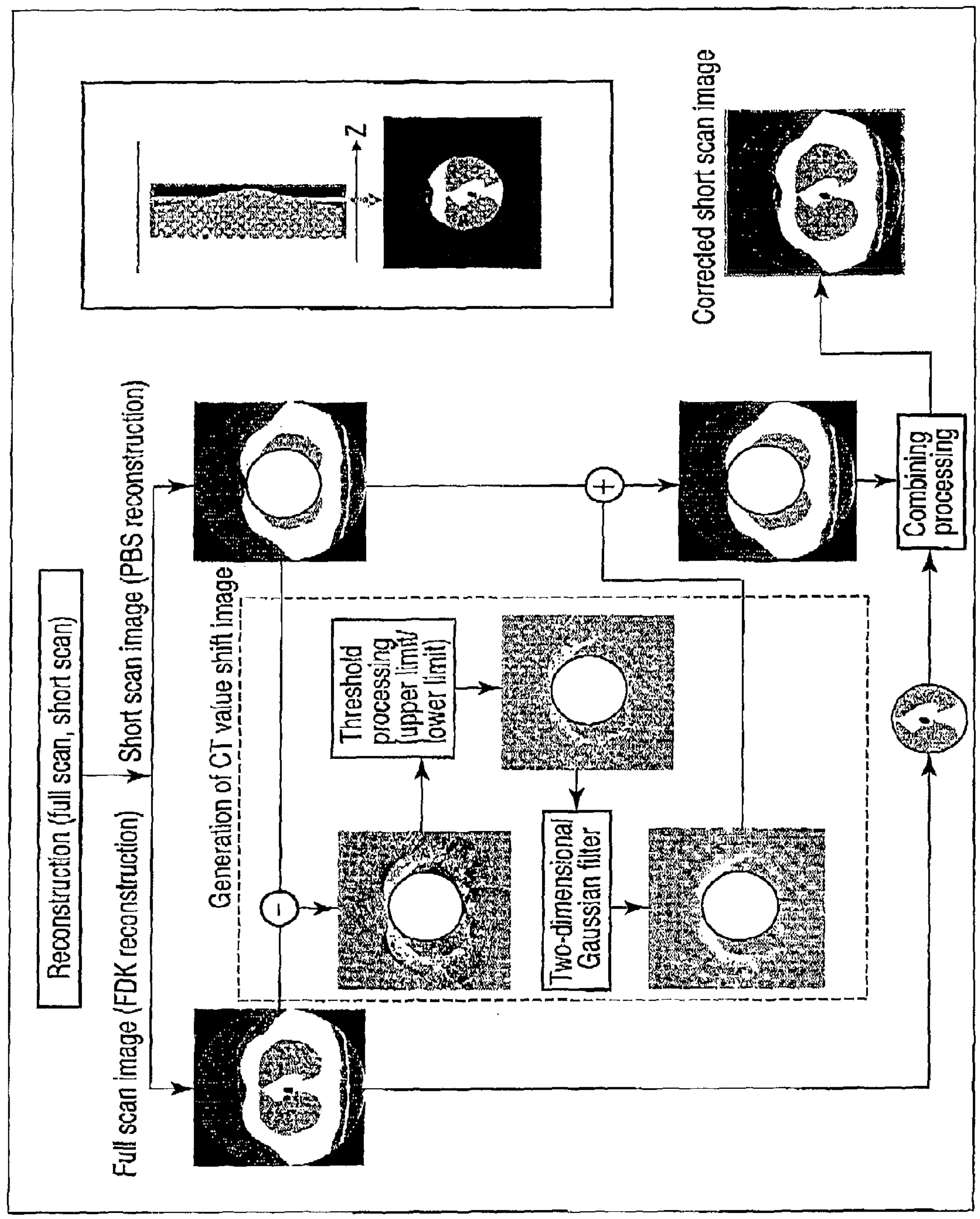
F I G. 4

X-RAY COMPUTER TOMOGRAPHY APPARATUS

CROSS-REFERENCE TO RELATED APPLICATIONS

This application is based upon and claims the benefit of priority from prior Japanese Patent Application No. 2008-207018, filed Aug. 11, 2008, the entire contents of which are incorporated herein by reference.

BACKGROUND OF THE INVENTION

1. Field of the Invention

The present invention relates to an X-ray computer tomography apparatus (CT (Computer Tomography)) including a circular orbit cone beam reconstruction function.

2. Description of the Related Art

Feldkamp et al. have proposed a circular orbit cone beam reconstruction method. In this reconstruction method, the two end portions of a reconstruction area include areas (mask areas) in which 360° projection data are not all obtained. The image quality of the mask areas is low. For this reason, the mask areas are excluded from image reconstruction processing and are not imaged. Even if mask areas are forced to be reconstructed, it is highly possible that distortion, a deterioration in shape reproducibility, and CT value shifts will occur.

BRIEF SUMMARY OF THE INVENTION

It is an object of the present invention to improve the image quality of mask areas in the circular orbit cone beam reconstruction method.

According to an aspect of the present invention, there is provided an X-ray computer tomography apparatus comprising:

an X-ray tube which generates cone beam X-rays;

a two-dimensional array type X-ray detector which detects X-rays transmitted through an object and generates projection data;

a rotating mechanism which supports the X-ray tube, together with the X-ray detector, so as to be rotatable around the object;

a reconstruction processing unit which reconstructs a full scan image based on projection data, of the projection data, which corresponds to a view count corresponding to one rotation and also reconstructs a short scan image based on projection data corresponding to a view count smaller than the view count corresponding to one rotation;

a CT value shift distribution generating unit which generates a spatial distribution of CT value shifts originating from the smaller view count based on the full scan image and the short scan image; and a correcting unit which corrects the short scan image based on the spatial distribution of the CT value shifts.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the arrangement of an X-ray computer tomography apparatus according to an embodiment of the present invention;

FIG. 4 is a detailed flowchart for processing by the CT value shift image generating unit and short-scan image correcting unit in FIG. 1.

DETAILED DESCRIPTION OF THE INVENTION

Figure 2:
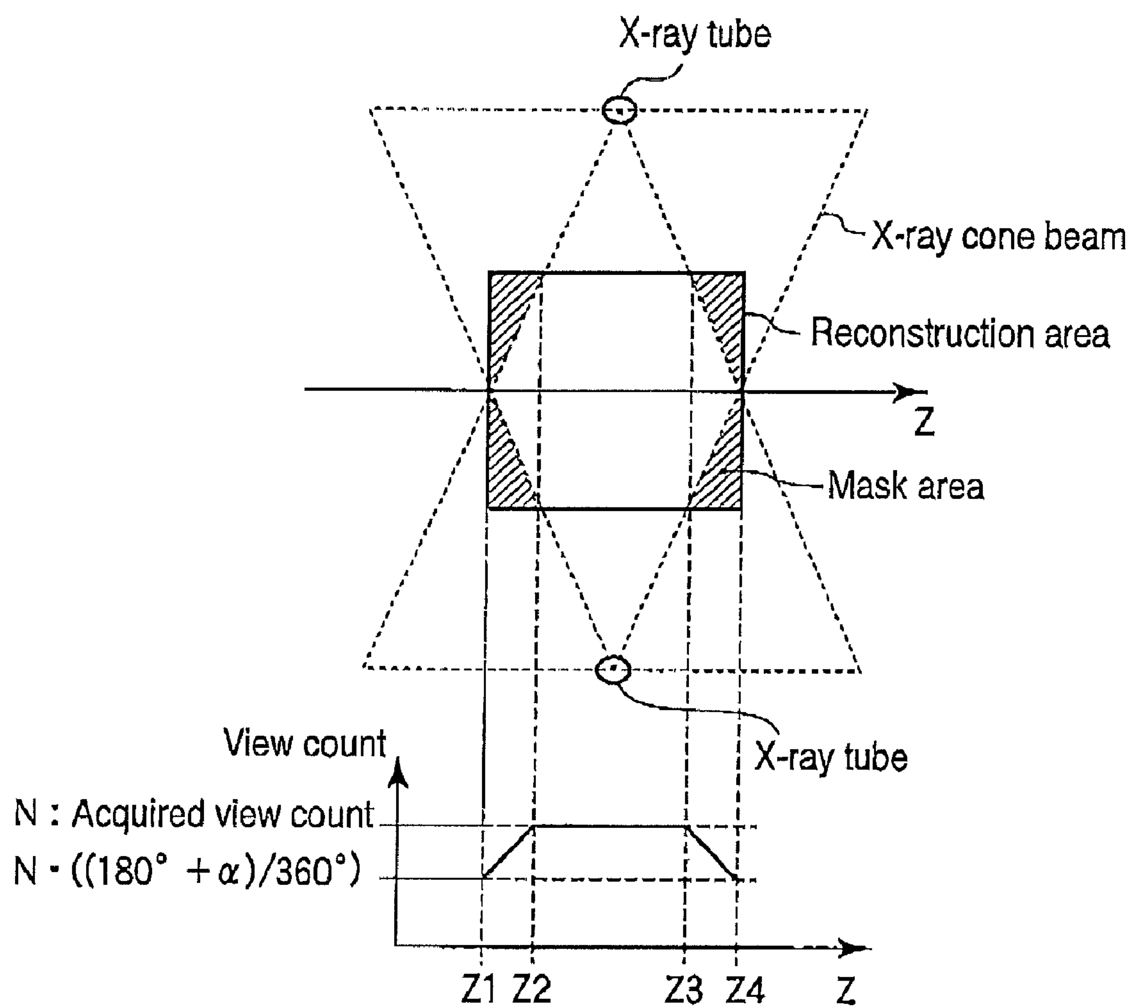
FIG. 2 is a supplementary view for explaining short-scan reconstruction concerning the two end portions of a reconstruction area by a reconstruction processing unit in FIG. 1.

An embodiment of an X-ray computer tomography apparatus according to the present invention will be described below with reference to the views of the accompanying drawing. Note that X-ray computer tomography apparatuses include a rotate/rotate-type apparatus in which an X-ray tube and an X-ray detector rotate together around an object, and a stationary/rotate-type apparatus in which many detectors are arranged in the form of a ring, and only an X-ray tube rotates around an object. The present invention can be applied to either type. Rotate/rotate-type apparatuses include a single tube apparatus in which a pair of an X-ray tube and an X-ray detector are mounted on a rotating frame, and a so-called multi-tube type apparatus in which a plurality of pairs of X-ray tubes and X-ray detectors are mounted on a rotating frame. The present invention can be applied to either type. X-ray detectors include an indirect conversion type that converts X-rays transmitted through an object into light through a phosphor such as a scintillator and converts the light into electric charges through photoelectric conversion elements such as photodiodes, and a direct conversion type that uses generation of electron-hole pairs in a semiconductor by X-rays and migration of the electron-hole pairs to an electrode, i.e., a photoconductive phenomenon. The present invention can be applied to either type.

FIG. 1 shows the arrangement of an X-ray computer tomography apparatus according to this embodiment. A gantry 100 includes an X-ray tube 101. The X-ray tube 101 receives a tube voltage and filament current from a high voltage generator through a slip ring 108, and generates an X-ray cone beam. The X-ray tube 101 is mounted, together with an X-ray detector 103, on a rotating frame 102 which is supported to be rotatable about a rotation axis (Z-axis). A rotational angle detection unit 107 is provided to detect the rotational angle of the rotating frame 102. In general, when the X-ray tube 101 is located at the top, the rotational angle of the rotating frame 102 is set to 0°. The X-ray detector 103 faces the X-ray tube 101 through a rotation axis RA. A cylindrical reconstruction area is set centered on the rotation axis RA via an input device 115.

The X-ray detector 103 detects X-rays emitted from the X-ray tube 101 and transmitted through an object. The X-ray detector 103 is of a multi-slice type or two-dimensional array type corresponding to a cone beam. That is, the X-ray detector 103 includes a plurality of X-ray detection element arrays juxtaposed along the rotation axis RA. Each X-ray detection element array includes a plurality of X-ray detection elements arrayed in a line along a direction perpendicular to the rotation axis RA.

A data acquisition system (DAS) 104 amplifies an output from the X-ray detector 103 for each channel, and converts it into a digital signal. For example, this signal is then sent to a preprocessing device 106 via a noncontact data transmission device 105 to be subjected to correction processing such as sensitivity correction. A projection data storage unit 116 stores the resultant data as so-called projection data at a stage immediately before reconstruction processing. A scan controller 110 controls a rotation driving unit, a high voltage generator 109, the data acquisition system 104, and the like to perform data acquisition (scanning).

A reconstruction processing unit 119 has a full reconstruction processing function of reconstructing an image by using projection data in an angular range of 360° and a short reconstruction processing function of reconstructing an image by using projection data in an angular range of less than 360° and equal to or more (180°+$\alpha$). A full reconstruction processing method is typically the Feldkamp method which is one of the cone beam image reconstruction methods. As is well known, the Feldkamp method is an approximate reconstruction method based on a fan beam convolution/back projection method. Convolution processing is performed by regarding data as fan projection data on the premise that the cone angle is relatively small. However, back projection processing is performed along an actual ray. That is, an image is reconstructed by the following procedure: assigning Z-axis-dependent weights to projection data, performing convolution for the weighted projection data by using the same reconstruction function as that for fan beam reconstruction, and performing back projection with respect to the resultant data along an actual oblique ray having a cone angle.

The short reconstruction processing method is also called PBS (Pixel Based Sector Reconstruction). PBS is a method of calculating the CT value of a reconstruction pixel by determining a plurality of rays passing through the reconstruction pixel and using projection data corresponding to the rays. Short scan reconstruction processing suffers from a so-called CT value shift phenomenon in which a CT value shifts from the true value because of a small number of projection data on which reconstruction processing is based. This embodiment corrects this CT value shift.

Figure 5:
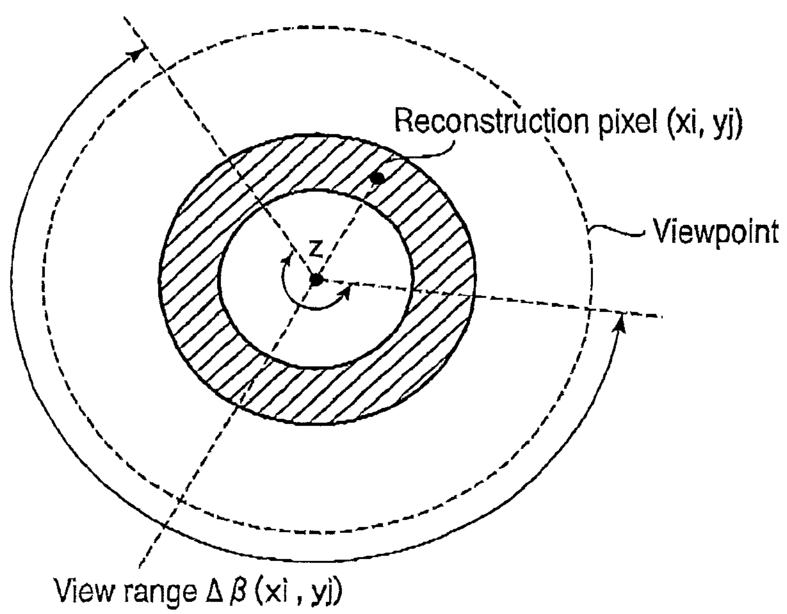
FIG. 5 is a view showing a view range representing the range of projection data used for short-scan reconstruction in this embodiment.

As exemplified in FIG. 5, in short scan reconstruction processing, the range (view range) of projection data used for short scan reconstruction processing is selected from the projection data stored in the projection data storage unit 116 in accordance with a slice position on the Z-axis and the position of a pixel as a reconstruction target. A view range is an angular range in which projection data originating from the actual transmission of X-rays at the position of a pixel as a reconstruction target is acquired.

As shown in FIG. 2, a view range is set for each pixel in mask areas in the two end portions (Z1 to Z2 and Z3 to Z4) of the cylindrical reconstruction area. A view range is determined by the Z position at a reconstruction position, the radius from the rotation axis (Z) to a target pixel, and a fan angle. The view count in the view range basically decreases continuously or stepwise from each of innermost positions Z2 and Z3 of the two end portions of the reconstruction range to a corresponding one of outermost positions Z1 and Z4. The innermost positions Z2 and Z3 are defined as Z positions of portions where the outer periphery of the reconstruction area intersects the periphery of cone beam X-rays.

According to reconstruction processing, in the central portion (Z2 to Z3) of the reconstruction area in which no mask areas exist, the number of views used for reconstruction is set to a view count N of projection data acquired per rotation. In the two end portions (Z1 to Z2 and Z3 to Z4) of the reconstruction area in which mask areas exist, the number of views used for reconstruction is decreased from the view count N per rotation to $N\cdot((180°+\alpha)/360°)$ equal to the view count required for half reconstruction in accordance with the Z position. Note that $\alpha$ represents a fan angle.

For the central portion (Z2 to Z3) of the reconstruction area in which all the projection data corresponding to one rotation is obtained and no mask areas exist and for the central circular portion of each slice in the two end portions (Z1 to Z2 and Z3 to Z4), the projection data of all views N are supplied for full scan reconstruction processing. In contrast, for the mask areas in the two end portions (Z1 to Z2 and Z3 to Z4), projection data corresponding to a view count which is smaller than N and corresponds to the Z position is supplied for short scan reconstruction processing. Performing full scan/short scan reconstruction processing in accordance with the Feldkamp reconstruction method/PBS method will reconstruct image data in the reconstruction area based on the selected projection data.

Figure 3:
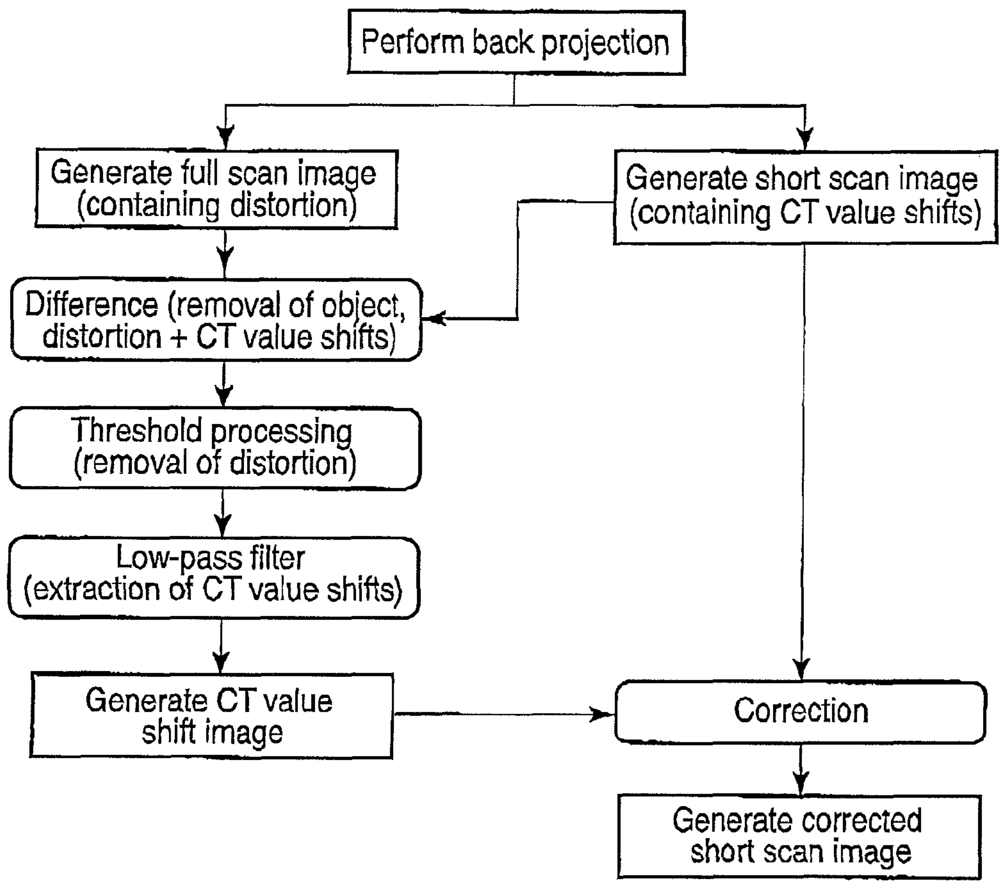
FIG. 3 is a flowchart for processing by a CT value shift image generating unit and short-scan image correcting unit in FIG. 1.

Based on a full scan image and a short scan image, a CT value shift image generating unit 121 generates the spatial distribution of CT value shifts (to be referred to as a CT value shift image hereinafter) in each mask area caused by short scan reconstruction processing. More specifically, as shown in FIGS. 3 and 4, an annular difference image is generated by subtracting the full scan image and the short scan image from each other. Both the full scan image and the short scan image equally contain shadows of an object such as a tissue and bone. The full scan image contains much distortion but does not contain many CT value shifts. In contrast, the short scan image does not contain much distortion but contains many CT value shifts. Consequently, distortion and CT value shifts remain in the difference image.

In addition, the distortion remaining in the is difference image is very high in absolute value due to the generation principle. Therefore, providing upper and lower limit thresholds, the threshold processing function of the CT value shift image generating unit 121 removes the pixel values of pixels, in the difference image, which exceed the upper limit threshold, i.e., replaces them with zero values, and removes likewise the pixel values of pixels which exceed the lower limit threshold, i.e., replaces them with zero values.

Furthermore, the CT value shift extraction processing function of the CT value shift image generating unit 121 performs low-pass filtering processing such as two-dimensional Gaussian filtering for the difference image, from which distortion is removed, to reduce spatial high-frequency components such as residual tissue images and distortion and extract (enhance) CT value shift components, thereby finally generating (estimating) an annular CT value shift image in which CT value shift components are dominant.

A short scan image correcting unit 123 generates a short scan image with reduced CT value shifts by adding or subtracting the CT value shift image to or from the short scan image. Combining the corrected short scan image with a full scan image portion corresponding to the central circular portion can obtain a short scan is image in which distortion, a deterioration in shape reproducibility, and CT value shifts in the mask areas are suppressed.

As described above, according to this embodiment, in the circular orbit cone beam reconstruction method, the view counts used for reconstruction in the two end portions of the reconstruction area in which mask areas exist at least partially are gradually decreased in accordance with the Z position.

This can decrease the possibility that distortion and a deterioration in shape reproducibility will occur in the mask areas. In addition, CT value shifts due to this processing are obtained from a full can image and a short scan image. Correcting the short scan image by this processing can suppress the occurrence of CT value shifts.

Note that the present invention is not limited to the above embodiment, and constituent elements can be variously modified and embodied at the execution stage within the spirit and scope of the invention. Various inventions can be formed by proper combinations of a plurality of constituent elements disclosed in the above embodiments. For example, several constituent elements may be omitted from all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An X-ray computer tomography apparatus comprising:

an X-ray tube which generates cone beam X rays;

a two-dimensional array type X-ray detector which detects X-rays transmitted through an object and generates projection data;

a rotating mechanism which supports the X-ray tube, together with the X-ray detector, so as to be rotatable around the object;

a reconstruction processing unit which reconstructs a full scan image based on projection data, of the projection data, which corresponds to a view count corresponding to one rotation and also reconstructs a short scan image based on projection data corresponding to a view count smaller than the view count corresponding to one rotation;

a CT value shift distribution generating unit which generates a spatial distribution of CT value shifts originating from the smaller view count based on the full scan image and the short scan image; and a correcting unit which corrects the short scan image based on the spatial distribution of the CT value shifts.

2. The apparatus according to claim 1, wherein the reconstruction processing unit changes a view count of projection data used for reconstruction of the short scan image in two end portions of a reconstruction area in accordance with a reconstruction position on a rotation axis.

3. The apparatus according to claim 1, wherein the CT value shift distribution generating unit includes a difference image generating unit which generates a difference image by subtracting the short scan image from the full scan image; and a threshold processing unit which generates the CT value shift distribution by applying threshold processing to the difference image.

4. The apparatus according to claim 3, wherein the CT value shift distribution generating unit further includes a low-pass filter unit which applies low-pass filtering to the CT value shift distribution.

5. The apparatus according to claim 1, further comprising a combining processing unit which partially combines the full scan image and the short scan image.

6. The apparatus according to claim 1, further comprising a combining processing unit which combines a central portion of the full scan image and an annular portion of the short scan image.

7. An image processing apparatus comprising:

a storage unit which stores projection data acquired by using cone beam X-rays;

a reconstruction processing unit which reconstructs a full scan image based on projection data corresponding to a view count corresponding to one rotation and also reconstructs a short scan image based on projection data corresponding to a view count smaller than the view count corresponding to one rotation;

a CT value shift distribution generating unit which generates a spatial distribution of CT value shifts originating from the smaller view count based on the full scan image and the short scan image; and a correcting unit which corrects the short scan image based on the spatial distribution of the CT value shifts.

8. The apparatus according to claim 7, wherein the reconstruction processing unit changes a view count of projection data used for reconstruction of the short scan image in two end portions of a reconstruction area in accordance with a reconstruction position on a rotation axis.

9. The apparatus according to claim 7, wherein the CT value shift distribution generating unit includes a difference image generating unit which generates a difference image by subtracting the full scan image and the short scan image from each other; and a threshold processing unit which generates the CT value shift distribution by applying threshold processing to the difference image.

10. The apparatus according to claim 9, wherein the CT value shift distribution generating unit further includes a low-pass filter unit which applies low-pass filtering to the CT value shift distribution.

11. The apparatus according to claim 7, further comprising a combining processing unit which partially combines the full scan image and the short scan image.

12. The apparatus according to claim 7, further comprising a combining processing unit which combines a central portion of the full scan image and an annular portion of the short scan image.

13. An image generating method comprising:

reconstructing a full scan image based on projection data, of projection data acquired by using cone beam X-rays, which corresponds to a view count corresponding to one rotation;

reconstructing a short scan image based on projection data, of the projection data, which corresponds to a view count smaller than the view count corresponding to one rotation;

generating a spatial distribution of CT value shifts originating from the smaller view count based on the full scan image and the short scan image; and correcting the short scan image based on the spatial distribution of the CT value shifts.

14. The method according to claim 13, wherein a view count of projection data used for reconstruction of the short scan image in two end portions of a reconstruction area is changed in accordance with a reconstruction position on a rotation axis.

15. The method according to claim 13, wherein in generating a spatial distribution of CT value shifts, a difference image is generated by subtracting the full scan image and the short scan image from each other, and the CT value shift distribution is generated by applying threshold processing to the difference image.

16. The method according to claim 13, wherein in generating a spatial distribution of CT value shifts, low-pass filtering is applied to the CT value shift distribution.

17. The method according to claim 16, further comprising partially combining the full scan image and the short scan image.

18. The method according to claim 13, further comprising combining a central portion of the full scan image and an annular portion of the short scan image.

* * * * *